(12) United States Patent
May (10) Patent No.: US 6,533,187 B2
(45) Date of Patent: Mar. 18, 2003

(54) ADHESIVE DISPENSING GUN

(75) Inventor: Kevin J. May, Ballground, GA (US)

(73) Assignee: Illinois Tool Works Inc., Glenview, IL (US)

( * ) Notice: Subject to any disclaimer, the term of this patent is extended or adjusted under 35 U.S.C. 154(b) by 104 days.

(21) Appl. No.: 09/783,415

(22) Filed: Feb. 14, 2001

(65) Prior Publication Data

US 2002/0109019 A1 Aug. 15, 2002

(51) Int. Cl.[7] .......................... B05B 17/00; B05B 15/02
(52) U.S. Cl. .......................... 239/1; 239/106; 239/323; 239/527; 239/528; 239/583
(58) Field of Search .......................... 239/1, 104, 106, 239/112, 323, 304, 305, 373, 353, 527, 528, 583, 586, 338; 222/144.5, 148, 386.5, 389, 105; 137/15.04, 15.05, 240, 625.12, 625.13, 625.42

(56) References Cited

U.S. PATENT DOCUMENTS

| | | | | |
|---|---|---|---|---|
| 2,717,804 A | * | 9/1955 | White, Jr. .................. 239/112 |
| 3,417,923 A | * | 12/1968 | Carlson ...................... 239/528 |
| 3,786,990 A | * | 1/1974 | Hagfors ...................... 239/112 |
| 3,900,163 A | * | 8/1975 | Volker ......................... 239/112 |
| 4,083,474 A | * | 4/1978 | Waite et al. ................. 239/527 |
| 4,175,702 A | * | 11/1979 | Hetherington et al. ....... 239/528 |
| 4,928,882 A | * | 5/1990 | Awano et al. ............... 239/112 |
| 5,219,097 A | * | 6/1993 | Huber et al. ................ 239/112 |

\* cited by examiner

*Primary Examiner*—Steven J. Ganey
(74) *Attorney, Agent, or Firm*—Pitney, Hardin, Kipp & Szuch LLP (57) ABSTRACT

The spray gun includes a primary port for receiving a primary material such as adhesive or similar materials, for dispensing. The spray gun further includes a secondary port to receive an aerosol-based cleaner which is stored in an aerosol container within the handle of the spray gun. The valves associated with the primary and secondary ports are sequenced such that during ordinary depression of the trigger to apply the primary material, the aerosol-based cleaner is momentarily "poofed" through the nozzle to clean the nozzle prior to the application of the primary material. After the primary material has been applied and the trigger is released, the aerosol-based cleaner is again momentarily "poofed" through the nozzle to clean the nozzle.

26 Claims, 6 Drawing Sheets

FIG. 6

ADHESIVE DISPENSING GUN

BACKGROUND OF THE INVENTION

1. Field of the Invention

The present invention pertains to a spray gun, such as is used for adhesive or similar materials, wherein a short burst of aerosol product is used to clean the spray gun tip before and after each application. The valve for the adhesive or similar material and the valve for the aerosol cleaner are both activated in sequence by the operation of a single trigger-like device. Additionally, the present invention uses "bag-in-a-can" technology, particularly for packages in excess of one liter, wherein a collapsible container holds the adhesive or similar material and is placed with a relatively rigid container designed to withstand the pressurization of the propellant charged between the collapsible container and the relatively rigid container.

2. Description of the Prior Art

In the prior art, aerosol products utilize a solvent to create a solvent or suspension that includes the liquified propellant. The early precursors of aerosols were "bombs" of the late nineteenth century which dissolved insecticides in hydrocarbon mixtures.

As technology and environmental concerns have progressed, water has become a required ingredient in aerosol products. However, water does not mix easily with propellant agents. Furthermore, film producing agents such as adhesives are designed with close tolerances with respect to miscibility and resistance to shear.

Most adhesives are comprised of synthetic polymers. However, in water-based adhesives, these polymers are simply suspended using surfactants. These surfactants are very specific in their functions within the system and are susceptible to swings in temperature, shear, pH or chemical contamination.

Additionally, adhesives are designed to create a film which is tacky and resistant to contaminants that may degrade the tacky characteristic. To create an industrial adhesive designed to bond two substrates under varying conditions of exposure to heat, water and solvents, the film must not soften and release its hold on the substrate. Therefore, the surfaces of application equipment, such as a spray gun, exposed to film curing must remain free of adhesive build-up. The prior art has not addressed how to avoid such adhesive build-up using a self-cleaning operation which does not require specific actions by the user which are separate and distinct from the adhesive application process.

Moreover, to a limited extent, the use of water-based products in aerosol packages (that is, self-contained, pre-pressurized containers) is known in the prior art for products. Formulations are also known, to a limited extent, which require complete segregation from the propellants (such as "bag-in-a-can"). However, this technology has apparently not been used successfully for an adhesive or in a package larger than one liter.

OBJECTS AND SUMMARY OF THE INVENTION

It is therefore an object of the present invention to provide an adhesive spray gun which remains free of adhesive build-up.

It is therefore a further object of the present invention to provide a cleaning operation for an adhesive or similar spray gun wherein the cleaning of the device is integrated into the operation of the device.

It is therefore a still further object of the present invention to provide an adhesive spray gun with simple and intuitive controls.

It is therefore a still further object of the present invention to utilize "bag-in-a-can" technology wherein the adhesive or similar product is placed within a collapsible bag which is placed within a relatively rigid container and wherein propellant is charged between the relatively rigid container and the collapsible bag.

It is therefore a still further object of the present invention to utilize the above technology for containers larger than one liter.

These and other objects are attained by using an application gun which is a modified airless applicator which includes a first port for receiving the adhesive or other primary product and a second port for receiving aerosol-based solvent cleaner. The adhesive or other primary product is supplied from a collapsible bag which is placed in a relatively rigid container with propellant charged between the bag and the relatively rigid container. A perforated dip tube is molded to the bag to act as a siphon for the adhesive or other primary product. The aerosol-based solvent cleaner is provided within a small aerosol container attached via a threaded valve stem in the handle of the gun.

The trigger assembly is designed to open and close the valves to the first and second ports in sequence whereby the first stage, typically as the trigger assembly is partially depressed, meters a volume of solvent cleaner via the second port directly to the tip. During the second stage, the first port is opened and the adhesive or other primary product is dispensed through the tip for as long as the trigger assembly is held fully depressed. When the trigger assembly is released at the end of the application, the trigger assembly momentarily passes again through the first stage and a second volume of solvent cleaner is metered or "poofed" via the second port to the tip.

The apparatus is designed to work virtually simultaneously with the application process and is user-friendly with a reduced need for specific and separate maintenance operations. The apparatus further allows for a portable, self-contained supply of product and an automatic tip cleaning function. The apparatus is scalable, subject to weight and similar concerns. Furthermore, a wide range of products can be dispensed without the addition of ingredients that are hazardous to the user or to the environment.

DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
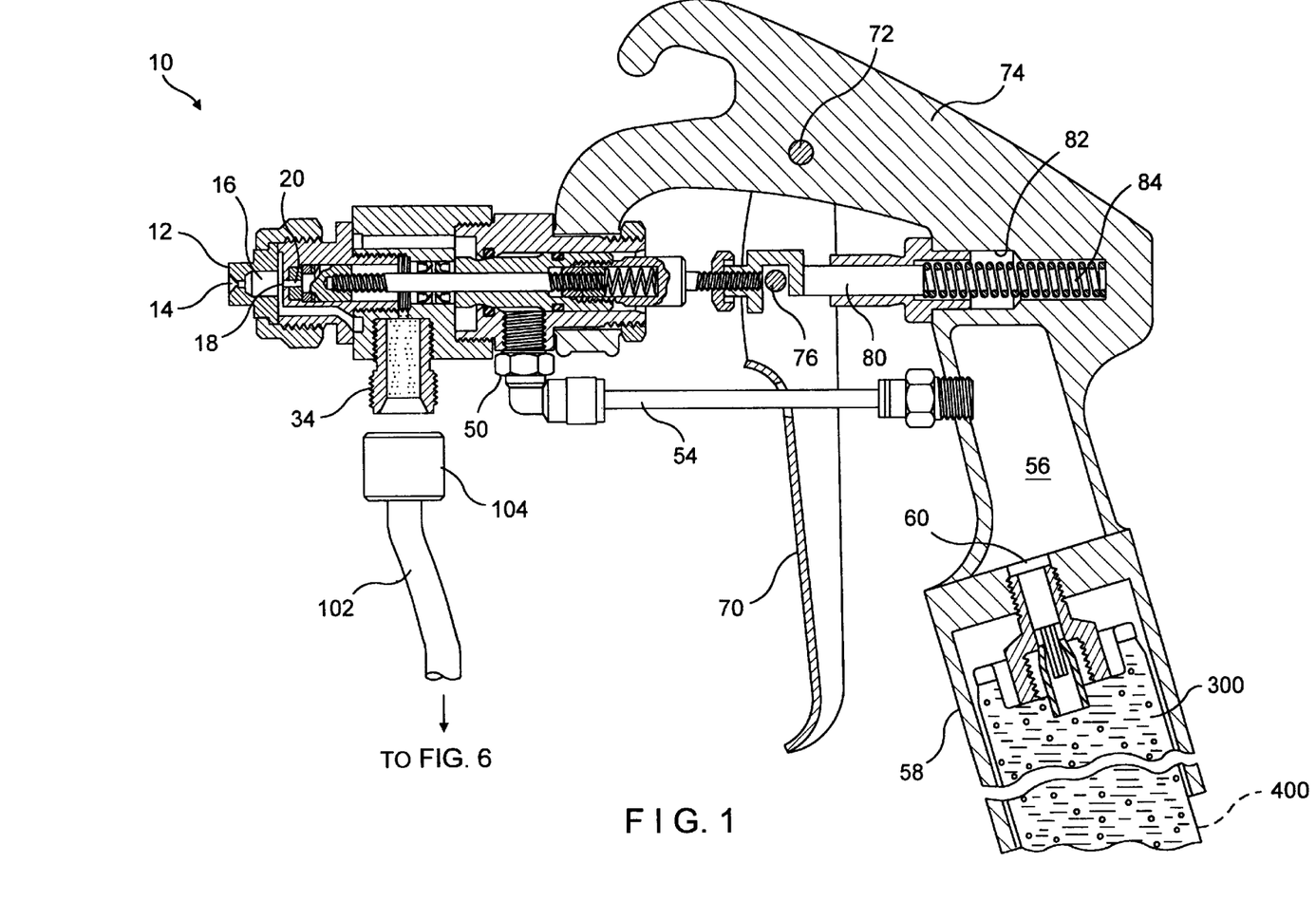
FIG. 1 is a cross-sectional side view, partially in phantom, of the spray gun of the present invention, shown at rest with the trigger not depressed.

Referring now to the drawings in detail wherein like numerals indicate like elements throughout the several views, one sees that FIG. 1 is a cross-sectional view of the spray gun 10 of the present invention. Spray gun 10 includes spray tip 12 with an aperture 14 therethrough for spraying or dispensing the adhesive or other primary material 200 and for further receiving the aerosol-based cleaner 300. The interior of tip 12 further includes chamber 16 which receives the primary material 200 to be dispensed or sprayed. Chamber 16 receives the adhesive or other primary material through central passageway 18 which is selectively opened or closed by needle 20 (see FIGS. 2–5). Needle 20 is integral with support 22 and primary slider 24. Primary slider 24 reciprocates within primary material chamber 26 as driven by shaft 28 which is adjustably received within threaded aperture 30 of primary slider 24. Primary material chamber 26 receives the primary material 200, such as adhesive or other materials to be dispensed or sprayed, via passageway 32 which communicates with primary material threaded port 34. Primary material threaded port 34 is fastened to hose 102 by internally threaded fastener 104 and thereby receives primary material 200 from pressurized tank 100 (see FIG. 6).

Figure 2:
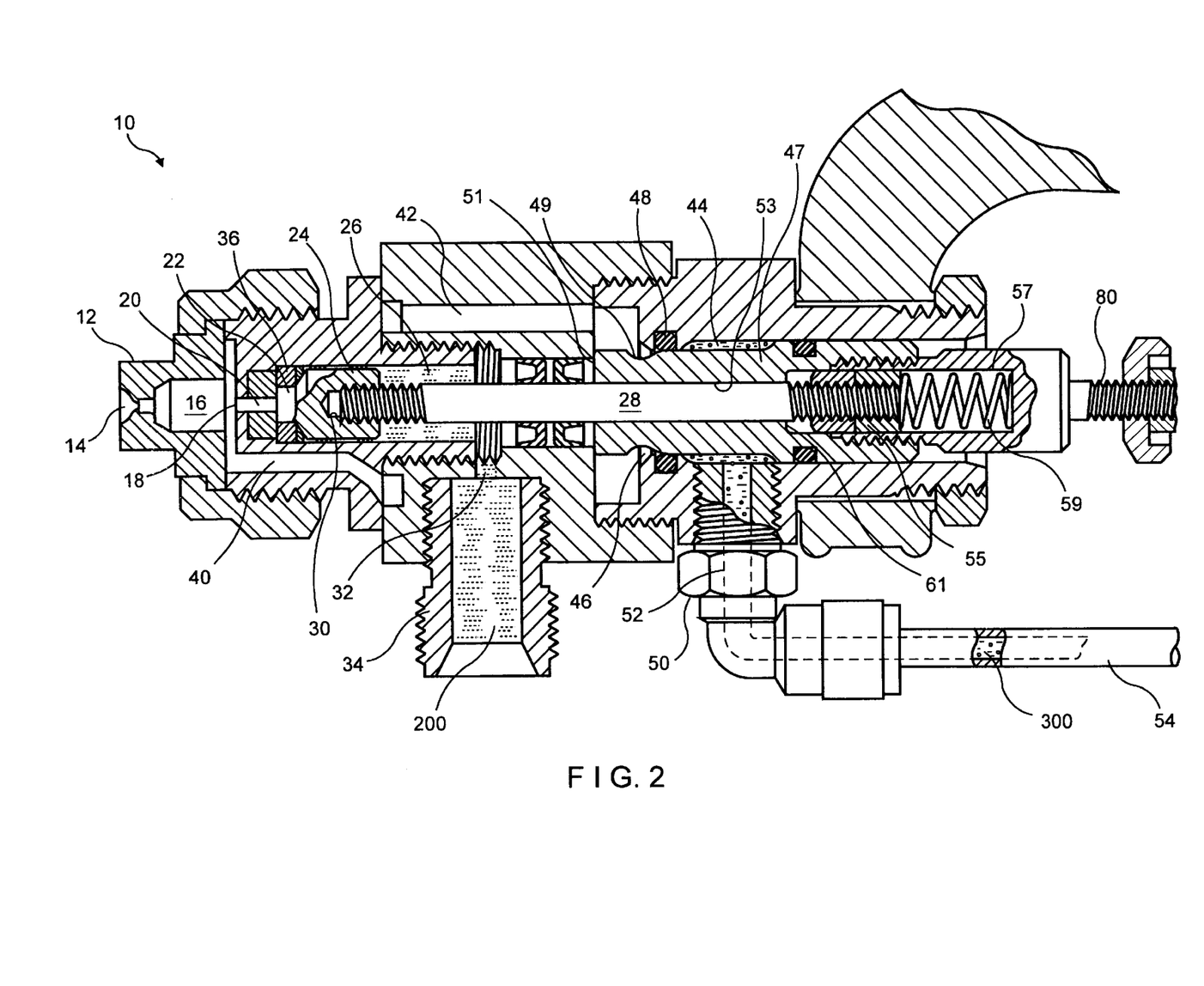
FIG. 2 is a cross-sectional side view of the valve assembly of the spray gun of the present invention, shown at rest with the trigger not depressed.
Figure 3:
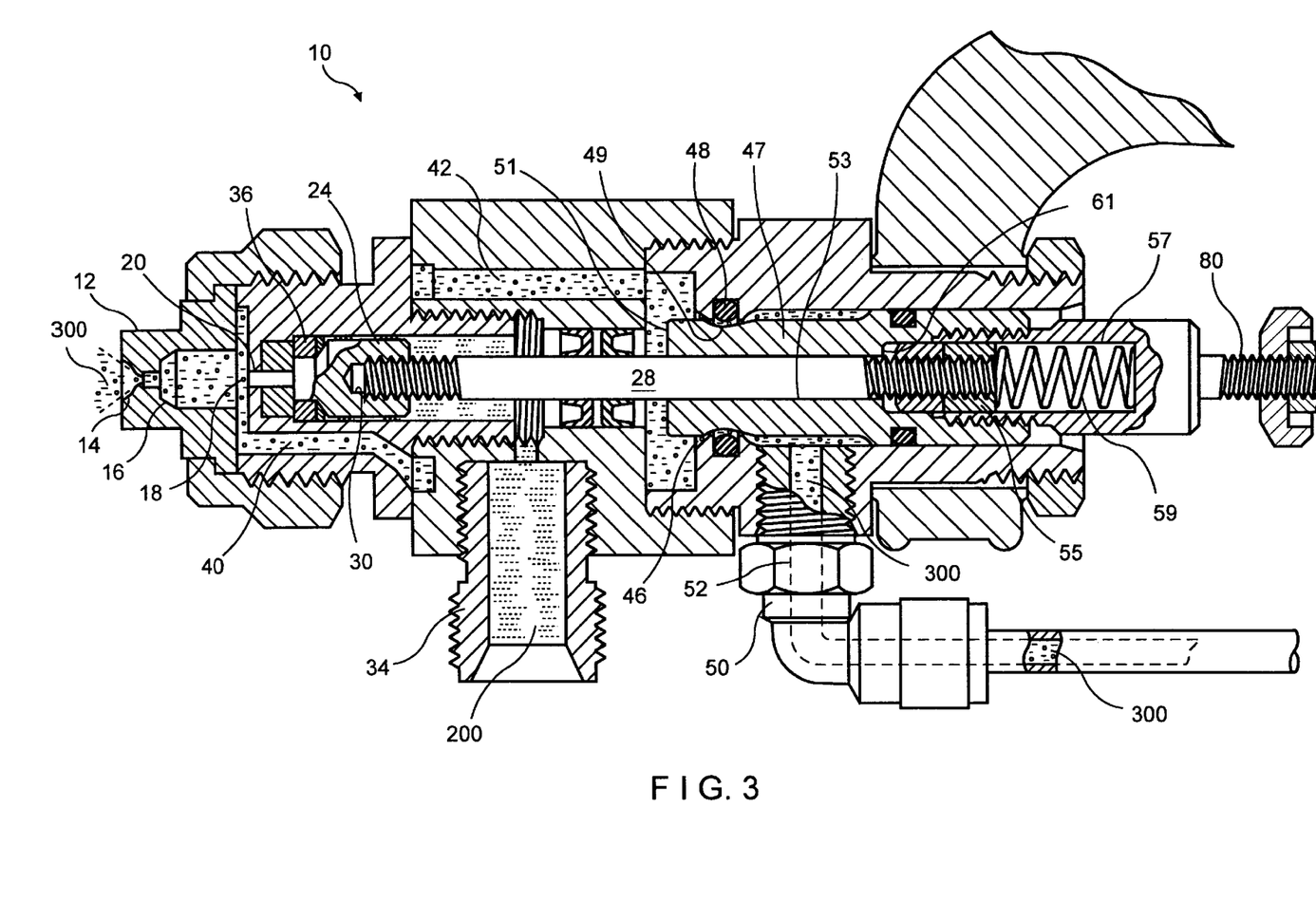
FIG. 3 is a cross-sectional side view of the valve assembly of the spray gun of the present invention, shown with the trigger partially depressed at a mid-point position, so that the aerosol-based cleaner is communicated to the sprayer tip.
Figure 4:
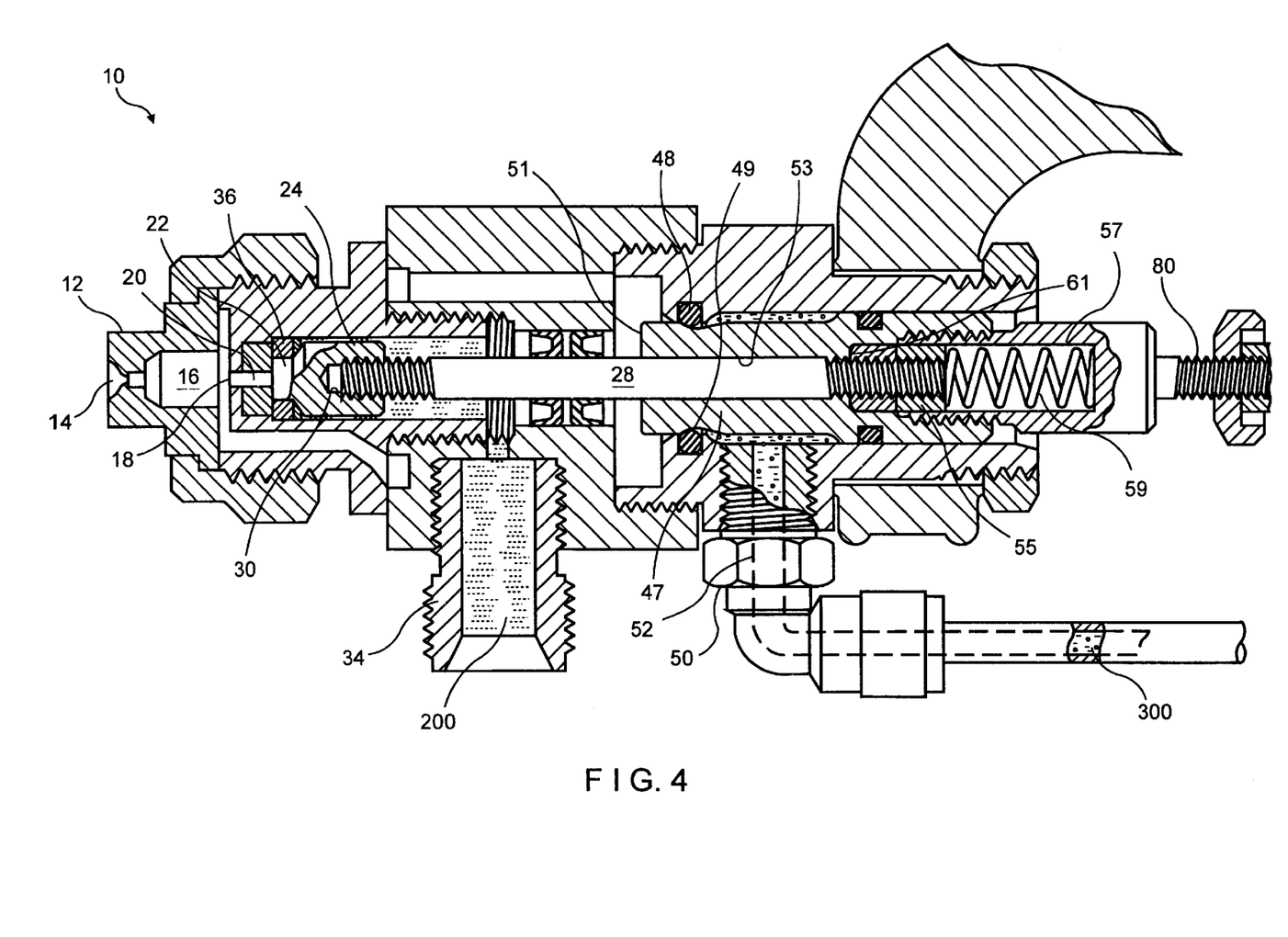
FIG. 4 is a cross-sectional side view of the valve assembly of the spray gun of the present invention, shown with the trigger depressed beyond the mid-point position but not to the fully depressed position, wherein neither the aerosol-based cleaner nor the adhesive or other product is communicated to the sprayer tip.
Figure 5:
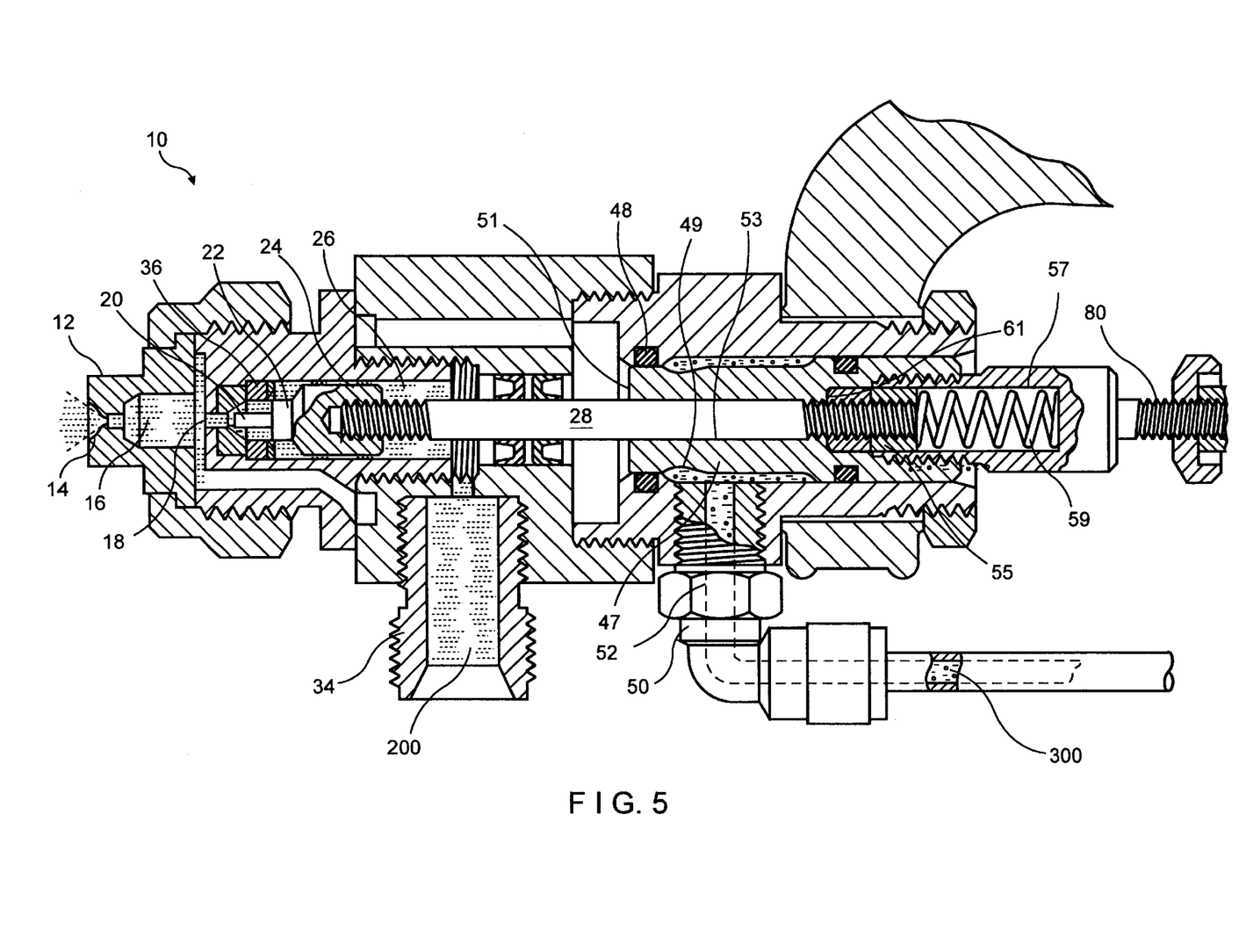
FIG. 5 is a cross-sectional side view of the valve assembly of the spray gun of the present invention, shown with the trigger fully depressed, wherein the adhesive or other product is communicated to the sprayer tip.

When needle 20 is inserted into central passageway 18 and support 22 is seated with seat 36 as shown in FIGS. 2, 3 and 4, primary material 200 is blocked from flowing into chamber 16 and is therefore not dispensed via tip 12. However, when the reciprocation of primary slider 24 withdraws needle 12 from central passageway 18 and support 22 from seat 36 as shown in FIG. 5, primary material 200 flows around primary slider 24, through central passageway 18 and is dispensed from tip 12.

Chamber 16 is likewise in communication with lateral channel 40 through which aerosol-based cleaner 300 is received. Lateral channel 40 is likewise in communication with secondary chamber 42 which is in selective communication with secondary valve passageway 44 via opening 46 as controlled by secondary slider 47 which reciprocates within secondary valve passageway and seal 48 which is secured around opening 46. Circumferential groove 49 is formed near the end 51 of secondary slider 47. Secondary valve passageway 44 is further in communication with secondary material threaded port 50 via passageway 52. Secondary material threaded port 50 receives secondary material 300 (that is, the aerosol-based cleaner) via pipe 54 which communicates to chamber 56 in handle 58. Chamber 56 includes aperture 60 which is in communication with aerosol container 400 which is contained within handle 58 and includes the secondary material 300 (that is, the aerosol-based cleaner).

Secondary material 300 is received within secondary valve passageway 44 and accumulates within the interstice formed between secondary slider 47 and the walls of secondary valve passageway 44. When secondary slider 47 is in the position shown in FIGS. 2, 4 and 5, secondary slider 47 is firmly engaged within seal 48 and no secondary material 300 is able to flow through mouth 46 past seal 48 and into secondary chamber 42. However, when secondary slider 47 is retracted sufficiently that circumferential groove 49 aligns with seal 48 as shown in FIG. 3, secondary material 300 is permitted to pass around seal 48 and through mouth 46 into secondary chamber 42, through lateral channel 40, chamber 16 and tip 12.

Secondary slider 47 includes longitudinal passageway 53 through which shaft 28 passes. Shaft 28 is secured to tertiary slider 55 which reciprocates within tertiary chamber 57. Spring 59 within tertiary chamber 57 biases tertiary slider 55 toward the forward position thereby, in the absence of other forces, urging shaft 28 and primary slider 24 to a forward position, thereby inserting needle 20 into central passageway 18. However, in the position shown in FIGS. 1, 2 and 3 (unlike FIGS. 4 and 5), tertiary slider 55 is spaced from wall 61 of tertiary chamber 57.

As shown in FIG. 1, trigger 70 is journaled to pivot about pivot point 72 on body 74 of spray gun 10. Trigger 70 includes boss 76 at a central upward location thereon which drives valve drive shaft 80. Valve drive shaft 80 is received within aperture 82 in body 74 and is biased by spring 84 within aperture 82 which urges valve drive shaft 80, in the absence of other forces (such as manual pressure by the user), to the position shown in FIGS. 1 and 2 wherein both primary material 200 and secondary material 300 are blocked from flowing by needle 20 of primary slider 24 and by secondary slider 47, respectively.

Valve drive shaft 80 is attached directly to secondary slider 47 so that secondary slider 47 moves in concert with valve drive shaft 80.

Therefore, when the trigger 70 is slightly depressed, such as would happen momentarily when the user initially depresses the trigger 70 but has not yet fully depressed the trigger 70, secondary slider 47 moves from the position shown in FIGS. 1 and 2 wherein the movement of secondary material 300 is blocked as described above, to the position shown in FIG. 3 wherein the circumferential groove 49 of secondary slider 47 aligns with seal 48 so that secondary material 300, such as an aerosol-based cleaner, moves freely past seal 48. This allows the secondary material 300 to move freely from aerosol container 400 through the route described above to be dispensed through tip 12. As this configuration happens only momentarily, a "poof" of aerosol cleaner is passed through aperture 14 of tip 12 to clean aperture 14. During this momentary "poof", secondary slider 47 has not moved sufficiently for wall 61 of tertiary chamber 57 to have engaged and urged tertiary slider 55 rearward. Therefore, needle 20 stays within central passageway 18 and no primary material 200 is dispensed.

As the user continues to depress trigger 70, the position shown in FIG. 4 is reached wherein circumferential groove 49 of secondary slider 47 is not aligned with seal 48. End 51 of secondary slider 47 is engaged within seal 48 thereby blocking the flow of secondary material 300 and terminating the "poof". Secondary slider 47 has still not moved sufficiently for wall 61 of tertiary chamber 57 to have urged tertiary slider 55 rearward. Therefore, needle 20 stays within central passageway 18 and no primary material 200 is dispensed. However, in the position shown in FIG. 4, wall 61 of tertiary chamber 57 abuts tertiary slider 55, so that further movement of trigger 70 will translate into movement of secondary slider 47 and tertiary slider 55 in concert.

This further movement of trigger 70 with the movement of secondary and tertiary sliders 47, 55 in concert results in the movement of primary slider 24 via the mechanical communication of shaft 20 thereby resulting in the position shown in FIG. 5 wherein needle 20 is withdrawn from central passageway 18 thereby allowing the flow of primary material 200. However, end 51 of secondary slider 47 is remains engaged within seal 48 thereby blocking the flow of secondary material 300. This position is maintained for as long as trigger 70 is fully depressed for the application of primary material 200.

When the user releases trigger 70, spring 84 forces the valve drive shaft 80 back to the position shown in FIGS. 1 and 2 and spring 59 likewise forces tertiary slider 55 forward whereby needle 20 is inserted into central passageway 18 as shown in FIGS. 1 and 2. However, during this transition, the spray gun 10 passes through the positions of FIGS. 4 and 3, sequentially, thereby resulting in another "poof" of secondary material 300 to clean aperture 14 of tip 12 immediately after the termination of the application of primary material 200.

Figure 6:
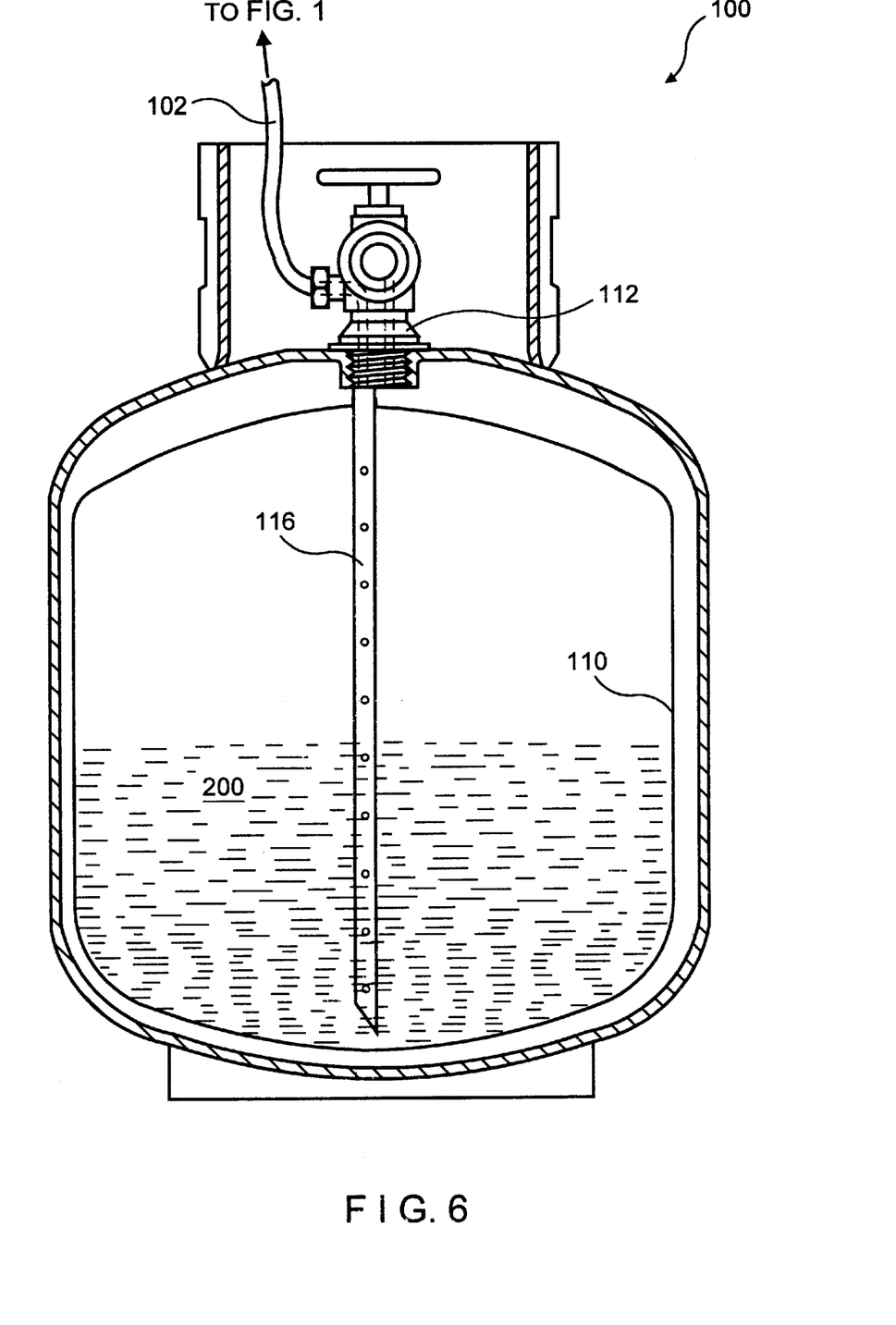
FIG. 6 is a cross-sectional view of the source of adhesive or other product wherein a collapsible bag of product is inserted into a relatively rigid container and propellant is charged therebetween.

FIG. 6 illustrates pressurized tank 100 which is relatively rigid. In fact, for industrial purposes, pressurized tank 100 is envisioned to be a steel cylinder (DOT-4BA) designed for propane or refrigerant containment or a similar application. However, for consumer applications, plastic containers (such as PET) may be envisioned. Primary material 200, such as adhesive or similar materials, is contained within collapsible plastic bag 110 contained within pressurized tank 100. Bag 110 is made of any material suitable for the separation and containment of the primary material 200. Polypropylene is envisioned, but those skilled in the art will recognize that a range of equivalent substitutes are available. Bag 110 is preferably slightly oversized.

Propellant 500 is charged between pressurized tank 100 and bag 110. This propellant 500 provides the differential pressure to drive primary material 200 out of bag 110 when the various valves have been suitable opened.

A cylinder valve 112 is threaded onto a receiving port 114 of the pressurized tank 100. Cylinder valve 112 incorporates a quick-release air fitting to allow for easy installation and removal of bags 110. Perforated dipstick 116 is molded into bag 110 to act as a siphon for primary material 200 and provides a path for primary material 200 to pass through cylinder valve 112, through hose 102 and into primary material threaded port 34 (see FIGS. 1–5).

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A sprayer including:
   a sprayer tip;
   a first port for receiving a primary product to be dispensed through said sprayer tip, said primary product being pressurized;
   a second port for receiving a secondary product to be dispensed through said sprayer tip, said secondary product being pressurized independently of said primary product;
   a manual control which travels through a range, said range including a first end position, a second end position and an intermediate position; and
   a valve mechanism responsive to said manual control, wherein when said manual control is in said first position, said first port and said second port are closed; wherein when said manual control is in said second position, said first port is open and said second port is closed; and wherein when said manual control is in said intermediate position, said first port is closed and said second port is open.

2. The sprayer of claim 1 wherein said manual control is a trigger mechanism, wherein said first position is a rest position toward which said manual control is biased, wherein said second position is a substantially fully depressed position of said trigger mechanism, and wherein said trigger mechanism passes through said intermediate position when depressed from said first position to said second position.

3. The sprayer of claim 1 wherein said secondary product is aerosol based.

4. The sprayer of claim 1 wherein said secondary product is an aerosol based cleaner.

5. The sprayer of claim 1 wherein said primary product is adhesive.

6. A sprayer including:
   a sprayer tip;
   a first port for receiving a primary product to be dispensed through said sprayer tip;
   a second port for receiving a secondary product to be dispensed through said sprayer tip;
   a trigger mechanism which travels through a range, said range including a rest position toward which said trigger mechanism is biased, a substantially fully depressed position and an intermediate position, wherein said trigger mechanism passes through said intermediate position when depressed from said rest position to said fully depressed position;
   a valve mechanism responsive to said trigger mechanism, wherein when said trigger mechanism is in said rest position, said first port and said second port are closed; wherein when said trigger mechanism is in said substantially fully depressed position, said first port is open and said second port is closed; and wherein when said trigger mechanism is in said intermediate position, said first port is closed and said second port is open; and
   wherein said valve mechanism includes a primary chamber in which a primary slider reciprocates between a first primary slider position which inhibits flow of said primary product and a second primary slider position which allows flow of said primary product; and a secondary chamber in which a secondary slider reciprocates between a first secondary slider position and a second secondary slider position, with an intermediate secondary slider position therebetween, wherein said first and second secondary slider positions inhibit flow of said secondary product and said intermediate secondary slider position allows flow of said secondary product.

7. The sprayer of claim 6 wherein when said trigger mechanism is moved from said rest position to said intermediate position, said secondary slider moves from said from said first secondary slider position to said intermediate secondary slider position while said primary slider remains in said first primary slider position, thereby allowing flow of said secondary product while inhibiting flow of said primary product.

8. The sprayer of claim 7 wherein when said trigger mechanism is moved from said intermediate position to said substantially fully depressed position, said primary slider moves from said first primary slider position to said second primary slider position and said secondary slider moves from said intermediate secondary slider position to said second secondary slider position thereby allowing flow of said primary product while inhibiting flow of said secondary product.

9. The sprayer of claim 8 wherein said secondary slider includes a tertiary chamber therein, and a tertiary slider within said tertiary chamber, said tertiary slider in mechanical communication with said primary slider, wherein movement of said secondary slider from said first secondary slider position to said intermediate secondary slider position does not move said tertiary slider and wherein movement of said secondary slider from said intermediate secondary slider position to said second secondary slider position moves said tertiary slider thereby moving said primary slider from said first primary slider position to said second primary slider position.

10. The sprayer of claim 9 wherein said secondary product is an aerosol based cleaner.

11. The sprayer of claim 10 further including a handle toward which said trigger mechanism moves in said second position, said handle further including a cavity including container of said secondary product.

12. The sprayer of claim 11 wherein said primary product is contained within a collapsible bag which is contained within a rigid container with propellant charged between said collapsible bag and said rigid container, and wherein said primary product is communicated to said first port by a hose.

13. The sprayer of claim 12 wherein said primary product is communicated from said collapsible bag to said hose by a perforated tube.

14. A method of spraying including the steps of:
receiving a primary product through a first port to be dispensed through said sprayer tip, said primary product being pressurized;
receiving a secondary product through a second port to be dispensed through said sprayer tip, said secondary product being pressurized independently of said primary product;
providing a manual control which travels through a range, said range including a first end position, a second end position and an intermediate position; and
providing a valve mechanism responsive to said manual control, wherein when said manual control is in said first position, said first port and said second port are closed; wherein when said manual control is in said second position, said first port is open and said second port is closed; and wherein when said manual control is in said intermediate position, said first port is closed and said second port is open.

15. The method of spraying of claim 14 wherein said manual control is a trigger mechanism, wherein said first position is a rest position toward which said manual control is biased, wherein said second position is a substantially fully depressed position of said trigger mechanism, and wherein said trigger mechanism passes through said intermediate position when depressed from said first position to said second position.

16. The method of spraying of claim 14 wherein said secondary product is aerosol based.

17. The method of spraying of claim 14 wherein said secondary product is an aerosol based cleaner.

18. The method of spraying of claim 14 wherein said primary product is adhesive.

19. A method of spraying including the steps of:
receiving a primary product through a first port to be dispensed through said sprayer tip;
receiving a secondary product through a second port to be dispensed through said sprayer tip;
providing a trigger mechanism which travels through a range, said range including a rest position toward which said trigger mechanism is biased, a substantially fully depressed position and an intermediate position, wherein said trigger mechanism passes through said intermediate position when depressed from said rest position to said fully depressed position;
providing a valve mechanism responsive to said trigger mechanism, wherein when said trigger mechanism is in said rest position, said first port and said second port are closed; wherein when said trigger mechanism is in said substantially fully depressed position, said first port is open and said second port is closed; and wherein when said trigger mechanism is in said intermediate position, said first port is closed and said second port is open; and
wherein said valve mechanism includes a primary chamber in which a primary slider reciprocates between a first primary slider position which inhibits flow of said primary product and a second primary slider position which allows flow of said primary product; and a secondary chamber in which a secondary slider reciprocates between a first secondary slider position and a second secondary slider position, with an intermediate secondary slider position therebetween, wherein said first and second secondary slider positions inhibit flow of said secondary product and said intermediate secondary slider position allows flow of said secondary product.

20. The method of spraying of claim 19 wherein when said trigger mechanism is moved from said rest position to said intermediate position, said secondary slider moves from said from said first secondary slider position to said intermediate secondary slider position while said primary slider remains in said first primary slider position, thereby allowing flow of said secondary product while inhibiting flow of said primary product.

21. The method of spraying of claim 20 wherein when said trigger mechanism is moved from said intermediate position to said substantially fully depressed position, said primary slider moves from said first primary slider position to said second primary slider position and said secondary slider moves from said intermediate secondary slider position to said second secondary slider position thereby allowing flow of said primary product while inhibiting flow of said secondary product.

22. The method of spraying of claim 21 wherein said secondary slider includes a tertiary chamber therein, and a tertiary slider within said tertiary chamber, said tertiary slider in mechanical communication with said primary slider, wherein movement of said secondary slider from said first secondary slider position to said intermediate secondary slider position does not move said tertiary slider and wherein movement of said secondary slider from said intermediate secondary slider position to said second secondary slider position moves said tertiary slider thereby moving said primary slider from said first primary slider position to said second primary slider position.

23. The method of spraying of claim 22 wherein said secondary product is an aerosol based cleaner.

24. The method of spraying of claim 23 further including a handle toward which said trigger mechanism moves in said second position, said handle further including a cavity including container of said secondary product.

25. The method of spraying of claim 24 further including the step of providing a collapsible bag within a rigid container to contain said primary product, the step of charging propellant between said collapsible bag and said rigid container, and the step of communicating said primary product to said first port by a hose.

26. The method of spraying of claim 25 wherein said step of communicating said primary product further includes the step of communicating said primary product by a perforated tube from said collapsible bag to said hose.

* * * * *